(12) United States Patent
Cook et al.

(10) Patent No.: US 7,450,007 B2
(45) Date of Patent: Nov. 11, 2008

(54) RFID ASSET IDENTIFICATION SYSTEMS

(75) Inventors: William Cook, Tampa, FL (US); Puneet Sawhney, Orlando, FL (US); Vishnu Naidu, Windermere, FL (US)

(73) Assignee: Chep Technology Pty Limited, Sidney (AU)

( * ) Notice: Subject to any disclaimer, the term of this patent is extended or adjusted under 35 U.S.C. 154(b) by 238 days.

(21) Appl. No.: 11/242,272

(22) Filed: Oct. 3, 2005

(65) Prior Publication Data

US 2007/0075861 A1    Apr. 5, 2007

(51) Int. Cl.
*G08B 13/14* (2006.01)
(52) U.S. Cl. .............. 340/568.1; 340/572.1; 340/539.1; 340/5.92; 235/385; 235/382.5
(58) Field of Classification Search .............. 340/568.1, 340/572.1, 540, 10.1, 825, 572.7–572.9, 340/5.1, 5.9, 5.92, 539.1, 539.22, 568.2, 340/539.26, 825.36; 235/385, 380, 382.5, 235/435
See application file for complete search history.

(56) References Cited

U.S. PATENT DOCUMENTS

| | | | |
|---|---|---|---|
| 4,061,820 A | 12/1977 | Magid et al. | |
| 5,367,148 A * | 11/1994 | Storch et al. | 235/375 |
| 5,478,990 A * | 12/1995 | Montanari et al. | 235/375 |
| 5,771,657 A | 6/1998 | Lasher et al. | |
| 5,831,531 A * | 11/1998 | Tuttle | 340/568.2 |
| 5,936,527 A | 8/1999 | Isaacman et al. | |
| 5,962,834 A * | 10/1999 | Markman | 235/385 |
| 5,973,598 A | 10/1999 | Beigel | |
| 5,973,600 A | 10/1999 | Mosher, Jr. | |
| 6,100,804 A | 8/2000 | Brady et al. | |
| 6,206,292 B1 | 3/2001 | Robertz et al. | |
| 6,260,049 B1 | 7/2001 | Fitzgerald et al. | |
| 6,317,648 B1 | 11/2001 | Sleep et al. | |
| 6,489,022 B1 | 12/2002 | Hamilton et al. | |
| 6,598,800 B1 * | 7/2003 | Schmit et al. | 235/462.44 |
| 6,601,763 B1 * | 8/2003 | Hoch et al. | 235/385 |
| 6,616,189 B2 | 9/2003 | Raming | |
| 6,663,006 B2 * | 12/2003 | Mullins et al. | 235/472.03 |
| 6,724,308 B2 | 4/2004 | Nicholson | |
| 6,816,075 B2 | 11/2004 | Grunes et al. | |
| 6,836,215 B1 | 12/2004 | Laurash et al. | |
| 6,837,427 B2 | 1/2005 | Overhultz et al. | |
| 6,861,993 B2 * | 3/2005 | Waldner | 343/742 |
| 6,996,402 B2 * | 2/2006 | Logan et al. | 455/456.1 |
| 7,055,750 B2 * | 6/2006 | Carrender | 235/472.01 |
| 7,075,435 B2 * | 7/2006 | Jesser | 340/572.1 |
| 7,111,780 B2 * | 9/2006 | Broussard et al. | 235/381 |
| 7,114,655 B2 * | 10/2006 | Chapman et al. | 235/462.01 |
| 7,135,973 B2 * | 11/2006 | Kittel et al. | 340/568.2 |
| 2003/0029063 A1 | 2/2003 | Takesada et al. | |
| 2004/0022227 A1 * | 2/2004 | Lynch et al. | 370/338 |
| 2004/0091702 A1 | 5/2004 | Hamilton et al. | |
| 2004/0145472 A1 | 7/2004 | Schmidtberg et al. | |
| 2006/0132310 A1 * | 6/2006 | Cox et al. | 340/572.1 |

* cited by examiner

*Primary Examiner*—Daniel Previl
(74) *Attorney, Agent, or Firm*—Allen, Dyer, Doppelt, Milbrath & Gilchrist, P.A.

(57) ABSTRACT

An RFID tag is configured to contain identification information in at least three forms. For instance, the RFID tag may include an RFID system, and a human readable number and a bar code that may be visible on an outer surface of the RFID tag. The RFID system, the human readable number and the bar code may generate the same asset identification number. The RFID tag may also be formed from two or more layers having a thickness sufficient to substantially eliminate interference caused by a shipping container to which the RFID tag is attached.

24 Claims, 2 Drawing Sheets

RFID ASSET IDENTIFICATION SYSTEMS

FIELD OF THE INVENTION

The present invention is directed generally to radio frequency identification (RFID) systems, and more particularly, to asset tracking systems that include RFID technology.

BACKGROUND OF THE INVENTION

RFID systems have proven useful in locating items in the shipping industry, and in other applications. RFID systems typically include an RFID reader and an RFID tag housing an antenna and a microchip. The RFID tag may be a passive RFID that uses energy from a radio frequency to power the tag. The RFID tag may generate a response to a radio frequency interrogation signal, and communicate information to a RFID reader.

RFID tags may be placed on a variety of shipping containers. Often times, RFID tags are placed on outer surfaces of shipping containers such that the RFID tags may be interrogated with an RFID reader as the shipping container moves through a shipping channel, such as along a conveyor belt, through a doorway or other appropriate locations. While RFID tags have proven useful, the accuracy of RFID tags has suffered in particular applications. For instance, RFID tags coupled to metal shipping containers have experienced interference in transmissions sent from the RFID tag caused by the proximity of the metal surface of the shipping container to the RFID tag. Such interference slows the process of interrogating an RFID tag and greatly hinders use of an RFID system. Thus, a need exists for an RFID tag capable of being attached to a metal surface with little or no quality degradation caused by the proximity of the metal surface to the RFID tag.

RFID tags are also used in asset tracking systems to track the location of reusable shipping containers. The RFID tags have included written information on an outer surface of the tags. In particular, RFID tags have included bar codes on an outer surface of the RFID tags. The bar codes enable the shipping container to be tracked using conventional bar code scanning technology. However, the bar code typically translates into a code that is different than a code generated by the RFID tag on which the bar code is imprinted. The different codes are useful only in different databases or when combined with a translation database.

As a result, difficulties are often experienced in the field when a bar code that generates a code different from an RFID tag to which it is imprinted is read in a warehouse that does not have the devices necessary to translate the bar code into usable information. These difficulties cause personnel in shipping warehouses and in other locations in a shipping channel to not record the shipping container in the asset tracking system.

In addition, personnel often conclude that it takes too much time to record the shipping container when the RFID tag is not functioning properly or for other such reasons. Thus, a need exists for providing a convenient way for personnel to record a shipping container in an asset tracking system to improve the reliability of the asset tracking system.

SUMMARY OF THE INVENTION

The present invention relates to an RFID tag that may be used to identify and track contents of a shipping container, also referred to as an asset, and to identify and track the shipping container itself. The RFID tag is configured to enable shipping facilities to perform these functions with equipment that is currently used by the shipping facilities. Thus, the RFID tag is configured to increase participation by employees at the shipping facility in an asset tracking system that includes the RFID tag by reducing the burden on the employees and the time required to participate in the system.

The RFID tag may be formed from a body that includes an RFID system, wherein the RFID system includes at least one memory storage device and an antenna. The RFID system may be adapted to generate an asset identification number. The RFID may also include a human readable number visible on an outer surface of the body. The human readable number may be the same as the asset identification number. A bar code may also be visible on the outer surface of the body. The bar code may be the same as the asset identification number.

In at least one embodiment, the asset identification number generated by the RFID system may be a hexadecimal equivalent of an Electronic Product Code (EPC) number. The asset identification number represented by the human readable number may be a decimal equivalent of the EPC number. The asset identification number represented by the bar code may be a hexadecimal equivalent of the EPC number. Thus, the RFID tag may store information that is readable in at least three forms, such that all three forms of the information generate the same code. Such a configuration increases participation in the system.

The body of the RFID tag may be configured to enable the RFID system to operate while attached to a metallic shipping container or other such container. The RFID tag may be formed from a body that offsets an outer surface of the RFID tag at least about 3/8 of an inch from an outer surface of the shipping container. For instance, the RFID tag may be formed from a base layer adapted to be attached to a surface, a middle layer coupled to an outer surface of the base layer, and an outer layer coupled to an outer surface of the middle layer.

The base and middle layers may be formed from materials, such as but not limited to, hydrophobic materials, foam, closed cell foam, polyethylene closed cell foam, and other appropriate materials. The outer layer may be formed from a water resistant coating, such as but not limited to, polyester and other appropriate materials.

The RFID tag may also include an adhesive layer coupled to the base layer for attaching the RFID tag to a shipping container. The adhesive layer may provide sufficient strength to withstand a washdown directed at the RFID tag up to about 20 psi nozzle pressure. Nozzle pressure of about 20 psi can equate to about 2,000 psi of pump pressure.

The memory storage device of the RFID tag may be formed from a first storage space that is read/write enabled for storage of information relating to contents being shipped within a shipping container. This first storage space may be, for example, used as customer information. There may also be a second storage space that is read only for storage of information relating to the shipping container. The memory storage device may be a 256-bit storage device, for example, or any other appropriate device.

An advantage of the RFID tag is that it enables personnel within a shipping channel to identify a shipping container via at least three different manners, including visual observation of a human readable number. Thus, when personnel are without an RFID reader, personnel may use the human readable number without trouble. Therefore, personnel are more likely to adhere to shipping protocol and identify the shipping container than in prior art embodiments in which the burdens placed on shipping personnel often resulted in shipping personnel not tracking all containers, thereby resulting in poor container tracking reliability.

Another advantage is that the RFID tag may include an offset enabling the RFID tag to be attached to a metal surface without the metal surface substantially affecting transmission of radio frequencies from the RFID tag.

Yet another advantage is that the RFID tag enables information corresponding to a shipping container to be stored on the RFID tag. In addition, information corresponding to the contents contained within the shipping container, such as information relating to a customer, may be stored in separate locations on the RFID tag.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
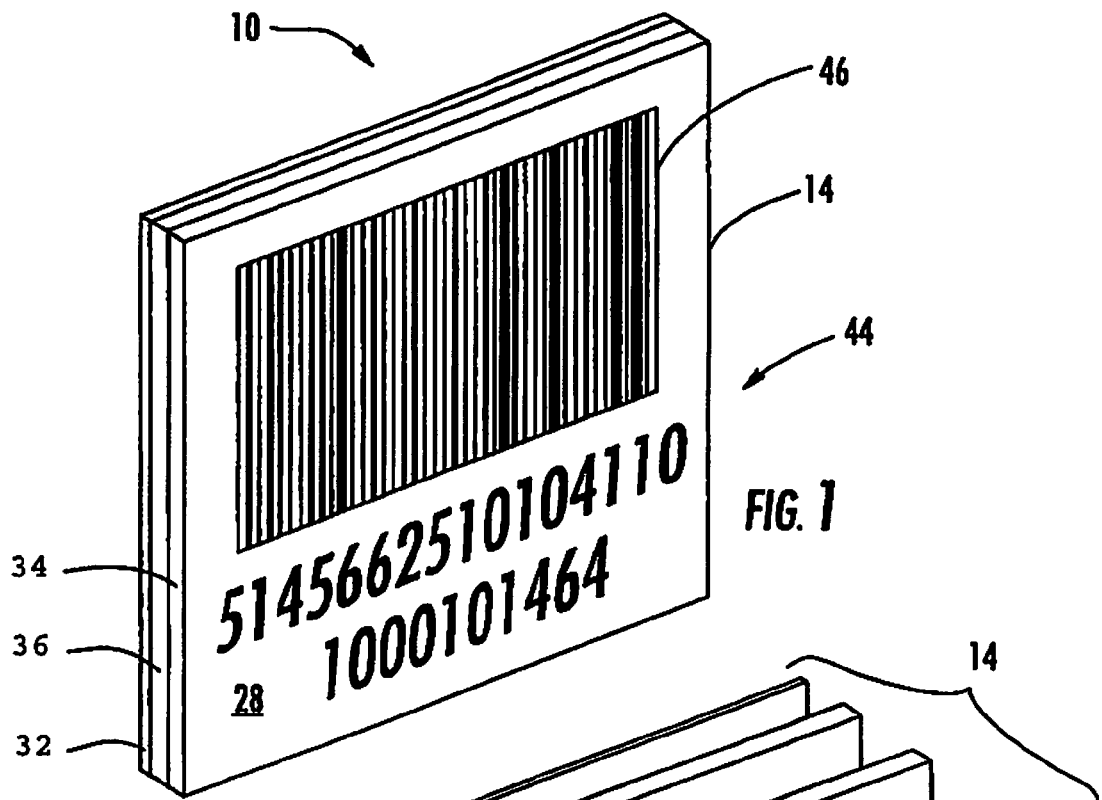
FIG. 1 is a perspective view of an RFID tag in accordance with the present invention.
Figure 2:
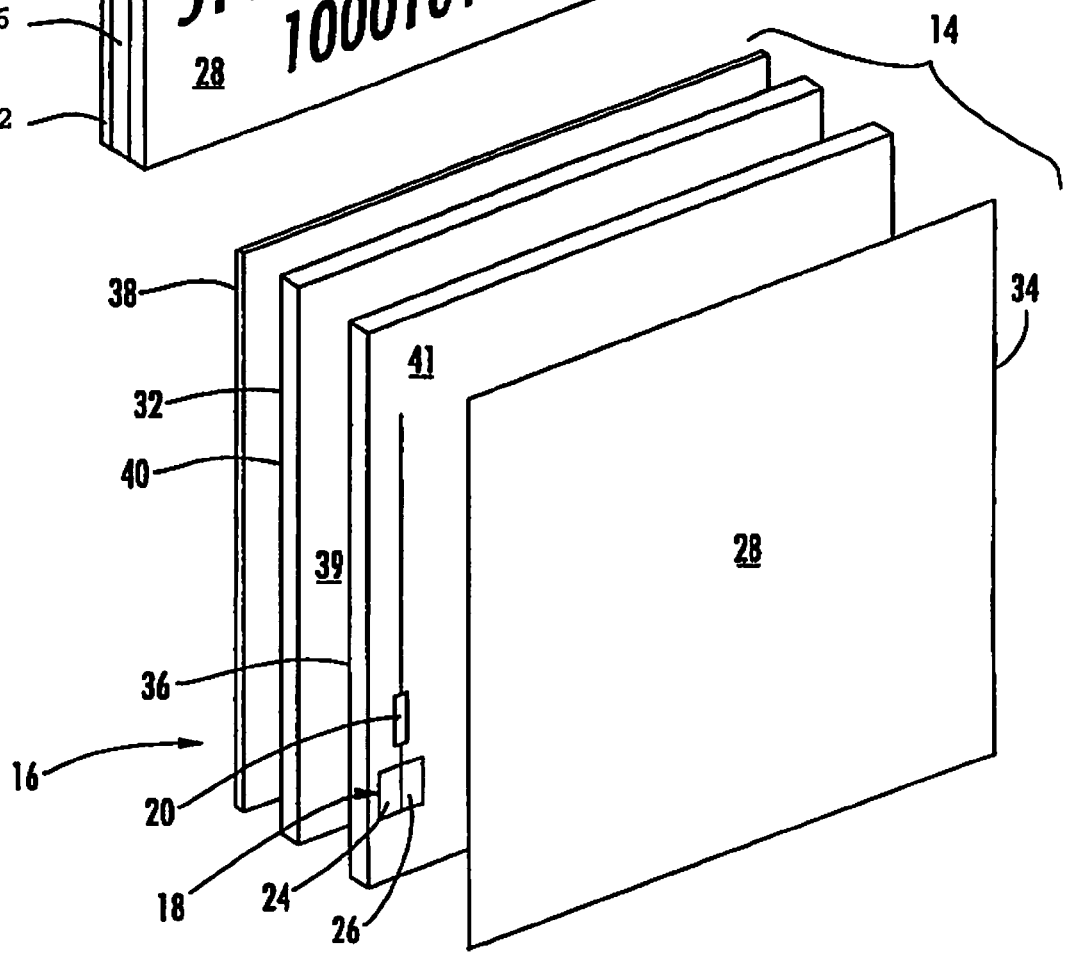
FIG. 2 is an exploded perspective view of the RFID tag shown in FIG. 1.
Figure 3:
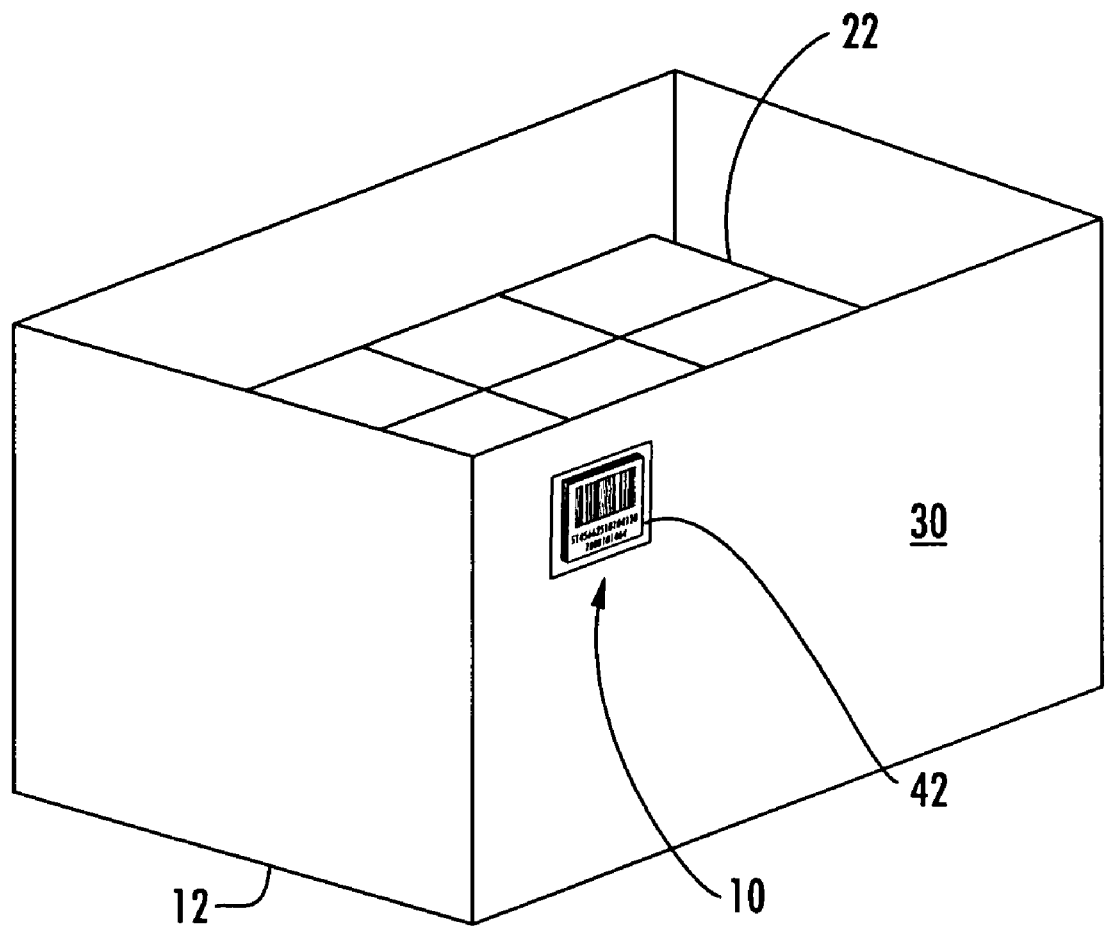
FIG. 3 is a perspective view of an RFID tag attached to a shipping container in accordance with the present.

As shown in FIGS. 1-3, the RFID tag 10 may be used to identify and track contents 22 of a shipping container 12, also referred to as an asset, and to identify and track the shipping container 12 itself. The RFID tag 10 is configured to enable shipping facilities to perform these functions with equipment that is currently used by the shipping facilities. Thus, the RFID tag 10 is configured to increase participation by employees at the shipping facility in an asset tracking system that includes the RFID tag 10 by reducing the burden on the employees and the time required to participate in the system.

In at least one embodiment, as shown in FIG. 2, the RFID tag 10 may be formed from a body 14 that includes an RFID system 16. The RFID tag 10 may be an active or a passive RFID tag. The RFID system 16 may include at least one memory storage device 18 and an antenna 20. The antenna 20 may be any antenna capable of operating within an RFID tag.

The memory storage device 18 may be configured to store information related to the shipping container 12 and to store information relating to the shipped contents 22 contained in the shipping container. In at least one embodiment, as shown schematically in FIG. 2, the memory storage device 18 may include a first space 24 with read/write capability for storing information relating to contents 22 of a shipping container 12, and include a second space 26 with read only capability for storing information relating to the shipping container.

For example, the first space 24 and the second space 26 each may include an EPC code for a product. The EPC code from the first space 24 may be a serial shipping container code (SSCC) and/or a global tradable item identifier (GTII). The EPC code from the second space 26 may be a serial number such as a global returnable asset identifier (GRAI).

In another embodiment, the first space 24 may include information from a vendor regarding the products being shipped, such as the shipment date, manufactured date, cost, number of items being shipped, and other appropriate information. The second space 26 may include information relating to the shipping container 12, such as but not limited to, the physical home location of the shipping container 12, information identifying the owner of the shipping container, such as the name and address, phone number and other information, the capacity of the shipping container, and other relevant information. The memory storage device 18 may be a 256-bit storage device or any other appropriate device. The memory storage device 18 may be a microchip or other appropriate device.

As shown in FIGS. 1-2, the RFID tag 10 may be formed such that the antenna 20 is capable of transmitting a radio frequency substantially without interference from the shipping container 12. In at least one embodiment, the RFID tag 10 is configured to enable the RFID system 16 to operate while attached to a metallic shipping container 12. The RFID tag 10 may be formed from a body 14 that offsets an outer surface 28 of the RFID tag 12 at least about ⅜ of an inch from an outer surface 30 of the shipping container 12.

For instance, the RFID tag 10 may be formed from a base layer 32, an outer layer 34, and a middle layer 36 positioned between the base and outer layers. The middle layer 36 may be coupled to an outer surface 39 of the base layer 32, and the outer layer 34 may be coupled to an outer surface 41 of the middle layer 36. The base layer 32 and the middle layer 36 may have a combined thickness of about ⅜ of an inch. For instance, the base layer 32 and the middle layer 36 may each have a thickness of about 3/16 of an inch. In other embodiments, the base layer 32 and the middle layer 36 may have different thicknesses.

The base and middle layers 32, 36 may be formed from a foam, such as but not limited to, a hydrophobic material, a closed cell foam, such as a polyethylene closed cell foam, and other appropriate materials. The outer layer 34 may be formed from a protective coating, such as but not limited to, polyester or other appropriate materials. The outer layer 34 may have a thickness of about 0.002 inch. In at least one embodiment, the RFID tag 10 may be formed such that a thickness of foam may be adjusted so that an outer surface 28 of the tag is substantially flush with an outer surface 30 of the shipping container 12. This may be accomplished by attaching the RFID tag 10 to the shipping container 12 in a recess 42 on the outer surface 30 of the container 12. In at least one embodiment, all or a portion of the RFID tag 10 may be encapsulated in a plastic or another suitable material that protects the RFID tag.

The outer surface 28 of the RFID tag 10 may colored to be easily visible. In at least one embodiment, the outer surface 28 of the RFID tag 10 may be brightly colored so that the RFID tag 10 may be easily identified and located on a shipping container 12.

The RFID tag 10 may also include an attachment device 38 for attaching the RFID tag 10 to the outer surface 30 of a shipping container 12. The attachment device 38 may be an adhesive that may cover all of or a portion of the surface 40 of the base layer 32. The adhesive layer 38 may have sufficient strength to withstand about 20 psi of pressure.

The RFID tag 10 may enable a single code to be stored in at least three different manners or formats. For instance, as shown in FIGS. 1 and 2, the RFID system 16 may be adapted to generate an asset identification number. A human readable number 44 may be visible on the outer surface 28 of the body 14. A bar code 46 may be visible on the outer surface 28 of the body 14 as well. The human readable number 44 and the bar code 46 may be the same as the asset identification number.

In at least one embodiment, the asset identification number generated by the RFID system 12 may be a hexadecimal equivalent of an EPC number. The asset identification number represented by the human readable number 44 may be a decimal equivalent of the EPC number. The asset identification number represented by the bar code 46 may be a hexadecimal equivalent of the EPC number. Such a configuration prevents vendors and other participants in the shipping channels from having to generate a separate identification system.

During use, the RFID tag 10 may be interrogated using conventional RFID technology. The RFID tag 10 may transmit information to an RFID reader. The information may be used to track the location of the asset 12 and to track the location of the shipped goods 22. It is desirable to determine the location of the shipping container 12 because many shipping containers 12 are reusable, and an important aspect of managing containers 12 within shipping channels is knowing the location of the shipping containers.

The RFID tag 10 may also be used to identify and track shipping containers 12 and shipped contents 22 without interrogating the RFID tag 10 with a radio frequency. Rather, identification information may be visually observed on an outer surface 28 of the RFID tag 10. In particular, the human readable number 44 and the bar code 46 enable identification information to be retrieved from the RFID tag 10 without using RFID technology. The human readable number 44 may be any number capable of being understood by a human. For instance, the human readable number 44 may be 5145662510104132000000111. A bar code reader may be used to read the bar code visible on the outer surface 28 of the RFID tag 10 to retrieve information on the shipping container 12 and on the contents 22 being shipped.

The foregoing is provided for purposes of illustrating, explaining, and describing embodiments of the invention. Modifications and adaptations to these embodiments will be apparent to those skilled in the art and may be made without departing from the scope of the invention.

We claim:

1. A radio frequency identification (RFID) tag comprising:
   a body;
   an RFID system carried by the body and comprising at least one memory storage device for storing an asset identification number and an antenna coupled thereto, the RFID system is to transmit the asset identification number when interrogated;
   a human readable number visible on an outer surface of the body, with the human readable number being the same as the asset identification number; and
   a bar code visible on the outer surface of the body, with the bar code being the same as the asset identification number;
   wherein the asset identification number transmitted by the RFID system is a hexadecimal equivalent of an electronic product code (EPC) number, the asset identification number represented by the human readable number is a decimal equivalent of the EPC number, and the asset identification number represented by the bar code is a hexadecimal equivalent of the EPC number.

2. The RFID tag of claim 1, wherein the body comprises a base layer to be attached to a surface, a middle layer coupled the base layer, and an outer layer coupled the middle layer; wherein the RFID system is carried by the middle layer, and the outer layer providing the outer surface of the body for displaying the human readable number and the bar code.

3. The REID tag of claim 2, wherein the base layer and middle layer each comprises foam.

4. The RFID tag of claim 3, wherein the base layer and middle layer have a combined thickness of about ⅜ of an inch thick.

5. The RFID tag of claim 3, wherein the foam of at least one of the base and middle layers comprises a closed cell foam.

6. The RFID tag of claim 2, wherein at least one of the base layer and the middle layer comprises a hydrophobic material.

7. The RFID tag of claim 2, wherein the outer layer comprises a water resistant film.

8. The RFID tag of claim 7, wherein the outer layer comprises polyester and has a thickness of about 0.002 inches.

9. The RFID tag of claim 2, further comprising an adhesive layer coupled to the base layer for attaching the body to a shipping container.

10. The REID tag of claim 9, wherein the adhesive layer provides sufficient strength to withstand a washdown directed at the body up to about 20 psi of nozzle pressure.

11. The RFID tag of claim 1, wherein the at least one memory storage device comprises a first storage space that is read/write enabled for storage of information relating to contents being shipped within a shipping container and; a second storage space that is read only enabled for storage of information relating to the shipping container.

12. The REID tag of claim 1, wherein the at least one memory storage device comprises a 256-bit memory storage device.

13. A radio frequency identification (RFID) tag comprising:
   a body comprising a base layer to be attached to a surface of an object to be identified, a middle layer coupled to the base layer, and an outer layer coupled to the middle layer;
   an RFID system carried by the middle layer and comprising at least one memory storage device for storing an asset identification number, the RFID system to transmit the asset identification number when interrogated;
   a human readable number visible on an outer surface of the outer layer, with the human readable number being the same as the asset identification number; and
   a bar code visible on the outer surface of the outer layer, with the bar code being the same as the asset identification number.

14. The RFID tag of claim 13, wherein the asset identification number transmitted by the RFID system is a hexadecimal equivalent of an electronic product code (EPC) number, the asset identification number represented by the human readable number is a decimal equivalent of the EPC number, and the asset identification number represented by the bar code is a hexadecimal equivalent of the EPC number.

15. The RFID tag of claim 13, wherein the base layer and middle layer each comprises foam.

16. The RFID tag of claim 15, wherein the base layer and the middle layer each have a thickness of about 3/16 of an inch.

17. The RFID tag of claim 15, wherein the foam of at least one of the base and middle layers comprises a closed cell foam.

18. The RFID tag of claim 13, wherein at least one of the base layer and the middle layer comprises a hydrophobic material.

19. The RFID tag of claim 13, wherein the outer layer comprises a water resistant film.

20. The RFID tag of claim 19, wherein the outer layer comprises polyester and has a thickness of about 0.002 inches.

21. The REID tag of claim 13, further comprising an adhesive layer coupled to the base layer for attaching the body to the object to be identified.

22. The RFID tag of claim 21, wherein the adhesive layer provides sufficient strength to withstand a washdown directed at the body up to about 20 psi of nozzle pressure.

23. The RFID tag of claim 13, wherein the at least one memory storage device comprises a first storage space that is read/write enabled for storage of information relating to contents being shipped within a shipping container and; a second storage space that is read only enabled for storage of information relating to the shipping container.

24. The REID tag of claim 13, wherein the at least one memory storage device comprises a 256 bit memory storage device.

* * * * *

UNITED STATES PATENT AND TRADEMARK OFFICE
CERTIFICATE OF CORRECTION

PATENT NO. : 7,450,007 B2  Page 1 of 1
APPLICATION NO. : 11/242272
DATED : November 11, 2008
INVENTOR(S) : Cook et al.

It is certified that error appears in the above-identified patent and that said Letters Patent is hereby corrected as shown below:

Column 3, Line 24     Delete: "present."
                      Insert: -- present invention. --

Column 6, Line 1      Delete: "REID"
                      Insert: -- RFID --

Column 6, Line 17     Delete: "REID"
                      Insert: -- RFID --

Column 6, Line 26     Delete: "REID"
                      Insert: -- RFID --

Column 8, Line 5      Delete: "REID"
                      Insert: -- RFID --

Signed and Sealed this

Third Day of February, 2009

JOHN DOLL
*Acting Director of the United States Patent and Trademark Office*